(12) United States Patent
Yakobov et al.

(10) Patent No.: US 10,822,105 B2
(45) Date of Patent: Nov. 3, 2020

(54) METHOD AND SYSTEM FOR CONTROLLING A CROSSING THRESHOLD USED IN DETERMINING ROTATIONAL SPEED OF A PROPELLER

(71) Applicant: PRATT & WHITNEY CANADA CORP., Longueuil (CA)

(72) Inventors: Ella Yakobov, Montreal (CA); Ian Farrell, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 239 days.

(21) Appl. No.: 16/129,286

(22) Filed: Sep. 12, 2018

(65) Prior Publication Data

US 2020/0010207 A1 Jan. 9, 2020

Related U.S. Application Data

(60) Provisional application No. 62/693,969, filed on Jul. 4, 2018.

(51) Int. Cl.
*B63C 11/00* (2006.01)
*B64D 31/06* (2006.01)
(Continued)

(52) U.S. Cl.
CPC .............. *B64D 31/06* (2013.01); *F02C 6/206* (2013.01); *F02C 3/06* (2013.01); *F02C 3/10* (2013.01);
(Continued)

(58) Field of Classification Search
CPC .... B64D 45/0005; B64D 35/02; B64D 31/06; B64C 11/30; B64C 11/301; B64C 11/40;
(Continued)

(56) References Cited

U.S. PATENT DOCUMENTS 3,801,830 A 4/1974 Boyer
4,163,232 A 9/1979 Henrich
(Continued)

FOREIGN PATENT DOCUMENTS

JP 2013257318 A 12/2013

OTHER PUBLICATIONS

Maxim Integrated Products MAX9924-MAX9927 datasheet, "Variable Reluctance Sensor Interfaces with Differential Input and Adaptive Peak Threshold" .

*Primary Examiner* — Dalena Tran
(74) *Attorney, Agent, or Firm* — Norton Rose Fulbright Canada LLP

(57) ABSTRACT

Systems and methods for controlling a crossing threshold used in determining a rotational speed of a propeller of an aircraft engine. An initial value for the crossing threshold is set. A sensor signal is received that comprises a first series of pulses indicative of passage of position markers about a circumference of a propeller shaft. A detection signal is generated that comprises a second series of pulses indicative of within the first series of pulses that have a zero-crossing transition and a magnitude that exceeds the crossing threshold. The rotational speed of the propeller is determined from the detection signal. The crossing threshold is adjusted as a function of the rotational speed.

20 Claims, 15 Drawing Sheets

(51) Int. Cl.
*F02C 6/20* (2006.01)
*F02C 3/06* (2006.01)
*F02C 3/10* (2006.01)

(52) U.S. Cl.
CPC .. *F05D 2220/323* (2013.01); *F05D 2270/021* (2013.01); *F05D 2270/44* (2013.01); *F05D 2270/80* (2013.01)

(58) Field of Classification Search
CPC ...... F01D 7/00; G01P 3/487; F05D 2220/323; F05D 2270/021; F05D 2270/44; F05D 2270/80
USPC ........ 701/100, 29.1; 73/170.02; 244/39, 234
See application file for complete search history.

(56) References Cited

U.S. PATENT DOCUMENTS

| | | | | |
|---|---|---|---|---|
| 6,171,055 | B1* | 1/2001 | Vos | F02C 9/44 |
| | | | | 416/1 |
| 7,049,859 | B2 | 5/2006 | Boyer et al. | |
| 8,608,441 | B2* | 12/2013 | Hotto | F03D 1/0608 |
| | | | | 416/42 |
| 2002/0088225 | A1* | 7/2002 | Koch | B64D 31/14 |
| | | | | 60/602 |
| 2005/0122098 | A1 | 6/2005 | Block et al. | |
| 2013/0328554 | A1 | 12/2013 | Pigott et al. | |
| 2016/0376003 | A1* | 12/2016 | Feldman | B64D 33/08 |
| | | | | 703/2 |
| 2018/0003073 | A1 | 1/2018 | Rowe et al. | |
| 2018/0050789 | A1 | 2/2018 | Marone et al. | |
| 2018/0050816 | A1 | 2/2018 | Yakobov et al. | |

\* cited by examiner

METHOD AND SYSTEM FOR CONTROLLING A CROSSING THRESHOLD USED IN DETERMINING ROTATIONAL SPEED OF A PROPELLER

CROSS-REFERENCE TO RELATED APPLICATIONS

The present application claims priority under 35 U.S.C. 119(e) of Provisional Patent Application bearing Ser. No. 62/693,969 filed on Jul. 4, 2018, the contents of which are hereby incorporated by reference.

TECHNICAL FIELD

The present disclosure relates generally to propeller feedback systems, and, more particularly, to methods and systems for controlling a crossing threshold of a propeller of an aircraft engine.

BACKGROUND OF THE ART

Some aircraft engines have propellers with a feedback ring mounted for rotation with the propeller. In such engines, the rotational speed of the propeller can be obtained from measuring the rotational speed of the feedback ring using local changes in a magnetic field.

However, existing systems for determining the rotational speed of the propeller may inaccurately determine the rotational speed of the propeller under certain circumstances.

As such, there is a need for improvement.

SUMMARY

In one aspect, there is provided a method of controlling a crossing threshold used in determining a rotational speed of a propeller of an aircraft engine. The method comprises setting an initial value for the crossing threshold; receiving a sensor signal comprising a first series of pulses indicative of passage of position markers about a circumference of a propeller shaft; generating a detection signal comprising a second series of pulses indicative of pulses within the first series of pulses that have a zero-crossing transition and a magnitude that exceeds the crossing threshold; determining the rotational speed of the propeller from the detection signal based on a time interval between a plurality of pulses of the second series of pulses; and adjusting the crossing threshold as a function of the rotational speed.

In another aspect, there is provided a system for controlling a crossing threshold used in determining a rotational speed of a propeller of an aircraft engine. The system comprises at least one processing unit; and at least one non-transitory computer-readable memory having stored thereon program instructions executable by the at least one processing unit for: setting an initial value for the crossing threshold; receiving a sensor signal comprising a first series of pulses indicative of passage of position markers about a circumference of a propeller shaft; generating a detection signal comprising a second series of pulses indicative of pulses within the first series of pulses that have a zero-crossing transition and a magnitude that exceeds the crossing threshold; determining the rotational speed of the propeller from the detection signal based on a time interval between a plurality of pulses of the second series of pulses; and adjusting the crossing threshold as a function of the rotational speed.

In yet another aspect there is provided systems and methods for controlling a crossing threshold used in determining a rotational speed of a propeller of an aircraft engine. An initial value for the crossing threshold is set. A sensor signal is received that comprises a first series of pulses indicative of passage of a plurality of position markers nearby the sensor. The plurality of position markers are positioned on a circumference of a feedback ring coupled to the propeller. The sensor is positioned adjacent the feedback ring. A detection signal is generated that comprises a second series of pulses indicative of within the first series of pulses that have a zero-crossing transition and a magnitude that exceeds the crossing threshold. The rotational speed of the propeller is determined from the detection signal. The crossing threshold is adjusted as a function of the rotational speed.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
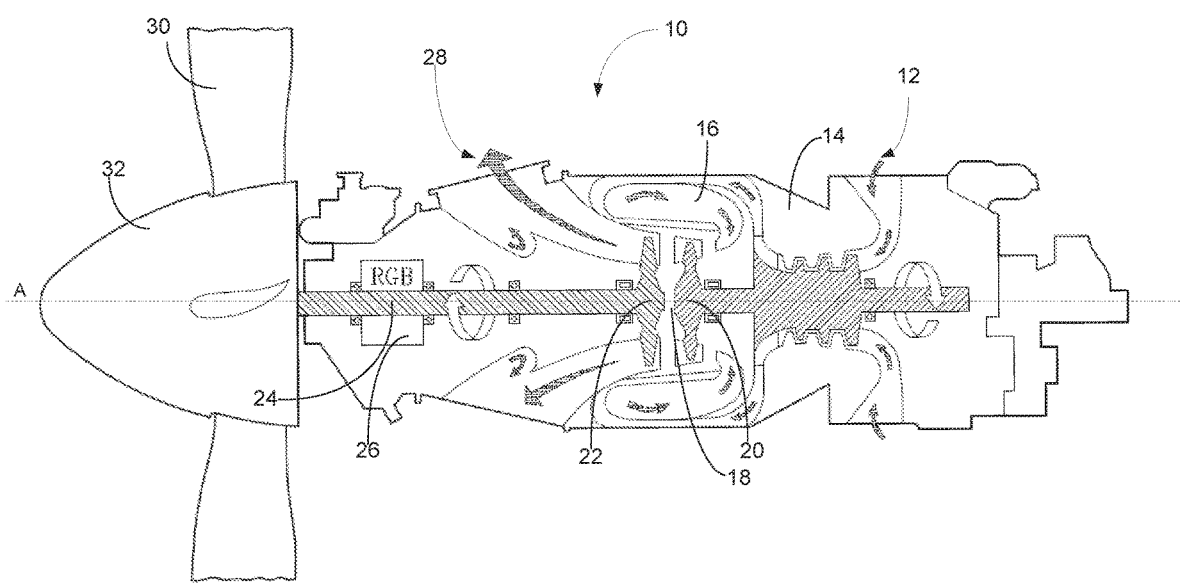
FIG. 1 is a schematic cross-sectional view of a gas turbine engine.

FIG. 1 illustrates a gas turbine engine 10, of a type typically provided for use in subsonic flight, comprising an inlet 12, through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively comprises a compressor turbine 20, which drives the compressor assembly and accessories, and at least one power or free turbine 22, which is independent from the compressor turbine 20 and rotatingly drives a rotor shaft 24 about a longitudinal propeller shaft axis A through a reduction gear box 26. Hot gases may then be evacuated through exhaust stubs 28. The gas generator of the engine 10 illustratively comprises the compressor section 14, the combustor 16, and the turbine section 18. A rotor 30, in the form of a propeller through which ambient air is propelled, is hosted in a propeller hub 32. Rotor 30 may, for example, comprise a propeller of a fixed-wing aircraft or a main (or tail) rotor of a rotary-wing aircraft such as a helicopter. The rotor 30 may comprise a plurality of circumferentially-arranged blades connected to a hub by any suitable means and extending radially therefrom. The blades are also each rotatable about their own radial axes through a plurality of blade angles, which can be changed to achieve modes of operation, such as feather, full reverse, and forward thrust.

Figure 2:
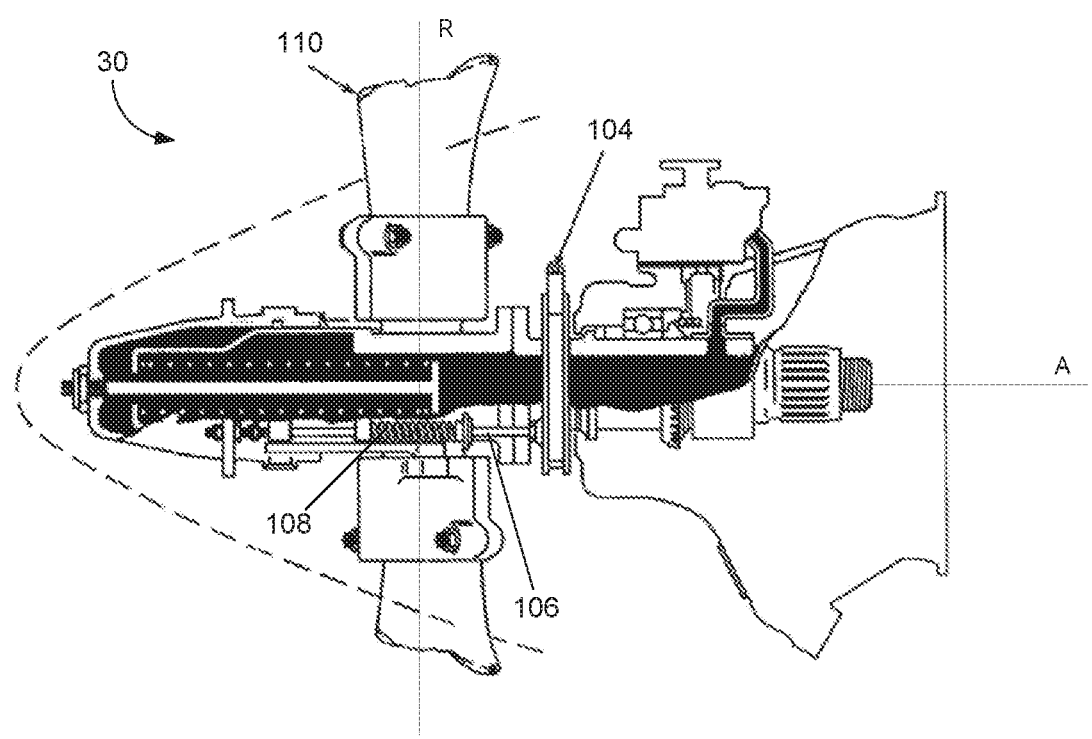
FIG. 2 is a schematic diagram of a propeller assembly comprising a feedback ring, in accordance with an illustrative embodiment.

As depicted in FIG. 2, a feedback ring 104 is supported for rotation with the propeller 30, which rotates about the longitudinal axis A. The feedback ring 104 is annular and may be referred to as a beta ring or a beta feedback ring.

The feedback ring 104 and/or the propeller 30 may be configured as described in one or more of U.S. Patent Application Publication Nos. 2015/0139798, 2018/0050789 and 2018/0050816, the content of which is hereby incorporated by reference. For example, the feedback ring 104 may also supported for longitudinal sliding movement along the longitudinal axis A, e.g. by support members, such as a series of circumferentially spaced beta feedback rods 106 that extend along the longitudinal axis A, where a compression spring 108 surrounds an end portion of each rod 106. The propeller 30 may comprise a plurality of angularly arranged blades 110 each of which is rotatable about a radially-extending axis R through a plurality of adjustable blade angles, the blade angle being the angle between the chord line (i.e. a line drawn between the leading and trailing edges of the blade) of the propeller blade section and a plane perpendicular to the axis of propeller rotation. The propeller 30 may be a reversing propeller 30 having a plurality of modes of operation, such as feather, full reverse, and forward thrust.

Figure 3:
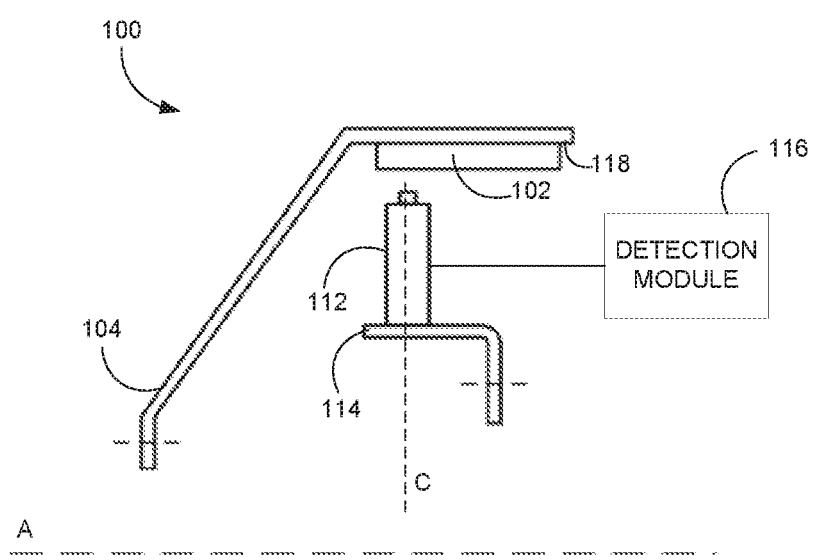
FIG. 3 is a schematic diagram of a system for detection of position markers of the feedback ring of FIG. 2, in accordance with an illustrative embodiment.

With additional reference to FIG. 3, a system 100 will now be described. In accordance with an embodiment, the system 100 may be used for measurement of rotational speed of propeller systems, such as the engine 10 of FIG. 1. The system may be used for detection of position markers 102 of the feedback ring 104. The system 100 may be used for control of a crossing threshold used in detecting the position markers 102. The system 100 may interface to existing mechanical interfaces of typical propeller systems.

The system 100 illustratively comprises a plurality of position markers 102 provided on a circumference of the feedback ring 104. The feedback ring 104 is used for determining the rotational speed of the propeller 30 and/or to provide blade (or beta) angle position feedback. During rotation of the propeller 30, the plurality of position markers 102 rotate with the feedback wheel 104 about the axis of rotation A and their passage is detected by at least one sensor 112 provided in a fixed relationship relative to the rotating propeller components. The sensor 112 may be any sensor (e.g. a speed transducer) configured to continuously detect passage of the position markers 102 during rotation of the propeller 30. In one embodiment, the sensor 112 is an electrically robust and environmentally sealed non-contact sensor suited for harsh environments and offering superior reliability. The sensor 112 may be any suitable inductive sensor having a varying reluctance or a Hall effect. In one embodiment, the sensor 112 is implemented as a transducer comprising a coil wound around a permanent magnet (not shown). The position markers 102 may then be made of a magnetically conductive material, e.g. a ferrous metal, to enable the sensor 112 to detect the passage thereof.

In the illustrated embodiment, the sensor 112 is mounted to a non-rotating part 14 (e.g., a flange) of the engine 10, so as to be positioned adjacent the plurality of position markers 102. In particular, the sensor 112 is illustratively secured to the propeller 30 so as to extend away from the flange 114 (and towards the position markers 102) along a direction C substantially transverse to the axis of rotation A. In one embodiment, a single sensor 112 is mounted in close proximity to the feedback ring 104 and the position markers 102. In another embodiment, in order to provide loss of probe protection, two (2) sensors 112 may be mounted in a diametrically opposite relationship relative to the position markers 102, which extend away from the feedback ring 104 and towards the sensor(s) 112. In other embodiments, any suitable number of sensors may be used. In yet another embodiment, several position markers 102 may be spaced equiangularly about the perimeter of the feedback ring 104. Other embodiments may apply.

Figure 4:
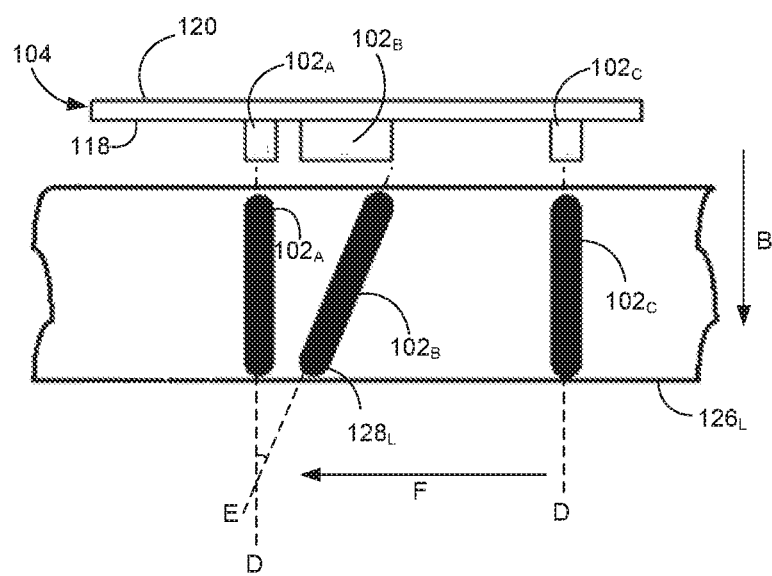
FIG. 4 illustrates an arrangement of FIG. 3 taken along view A rotated by ninety degrees, in accordance with an illustrative embodiment.

As shown in FIG. 4, in one embodiment, the position markers 102 comprise a plurality of spaced protrusions or teeth. The teeth 102 may be mounted (using any suitable attachment means, such as screws, bolts, and the like) to an inner face 118 of the feedback ring 104 or may be integrally formed with the feedback ring 104. In one embodiment, a total of three (3) teeth $102_A$, $102_B$, $102_C$, is provided about the perimeter of the feedback ring 104, as illustrated. It should however be understood that more or less than three (3) teeth may be provided. The configuration of the teeth 102 may vary depending on practical implementations. The teeth 102 may be configured as described in one or more of U.S. Patent Application Publication Nos. 2015/0139798, 2018/0050789 and 2018/0050816. In the illustrated embodiment, teeth $102_A$ and $102_C$ are positioned along a direction D, which is substantially parallel to the axis A and tooth (referred to herein as a detection tooth) $102_B$ is positioned along a direction E angled to the direction D, such that the tooth $102_B$ is offset relative to the teeth $102_A$ and $102_C$. However, the configuration of the $102_A$, $102_B$ and $102_C$ is for illustration purposes only. Accordingly, one or more of the teeth 102 may be angled or none of the teeth 102 may be angled, depending on practical implementations. The spacing between consecutive teeth 102 may be equidistant or non-equidistant. As illustrated in FIG. 3, each sensor 112 may be mounted to the flange 114 adjacent the inner face 118 of the feedback wheel 104, i.e. inside the feedback wheel 104. In an alternate embodiment, the teeth $102_A$, $102_B$, $102_C$ may be mounted to (e.g. extend away from) an outer face 120 (shown in FIG. 4) of the feedback ring 104 and each sensor 112 may accordingly be positioned adjacent the outer face 120, about a perimeter of the feedback wheel 104. In yet another embodiment, the position markers 102 may comprise slots (not shown) rather than teeth, with the slots being formed or otherwise machined in the feedback wheel 104 and made of a magnetically conductive material, e.g. a ferrous metal.

Figure 5A:
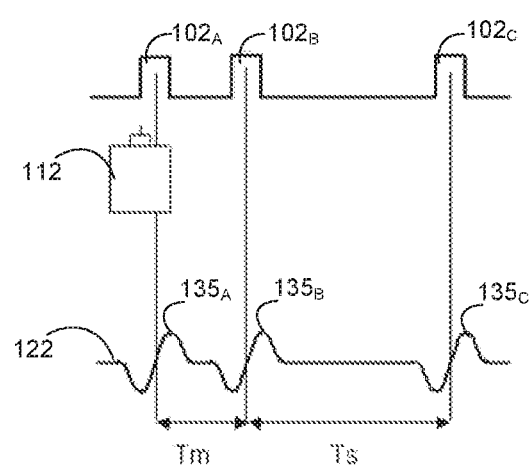
FIG. 5A is a schematic diagram illustrating operation of a sensor with a sensor signal having a negative polarity as position markers approach the sensor, in accordance with an illustrative embodiment.

In operation, the feedback ring 104 rotates (e.g. in the direction of arrow F) during rotation of the propeller 30. The sensor 112 then detects the passage of each one of the position markers $102_A$, $102_B$, $102_C$ and accordingly generates an output voltage signal (also referred to herein as a variable mark/space signal). An example of the output voltage signal is illustrated by waveform 122 in FIG. 5A. In particular, as the position markers $102_A$, $102_B$, $102_C$ are displaced by movement of the propeller 30, each one of the position markers (e.g. position marker $102_A$) approaches the sensor 112. This changes the sensor's reluctance and causes a magnetic field to be generated and current to flow in the sensor's coil. In the example of FIG. 5A, as each one of the position markers (e.g. position marker $102_A$) approaches the sensor 112, the sensor output signal 122 decreases to a negative value and as each one of the position markers (e.g. position marker $102_A$) passes the sensor 112, the sensor output signal 122 (e.g. a single pulse causing a positive voltage transition) increases. When the given position marker (e.g. position marker $102_A$) moves away from the sensor 112, the pulse shape is inverted and the sensor output signal 122 is returned to zero. Accordingly, a positive zero-crossing of the sensor output signal 122 may be indicative of the passage of a position marker 102 by the sensor 112.

Figure 5B:
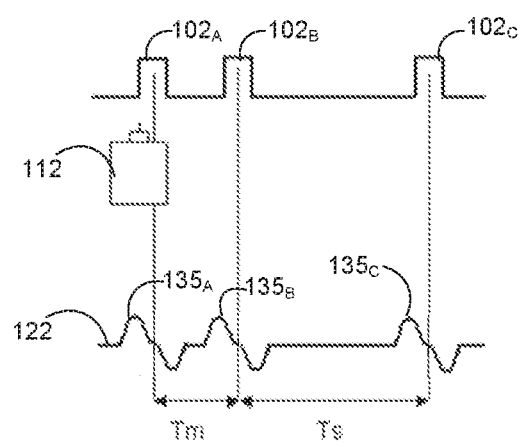
FIG. 5B is a schematic diagram illustrating operation of a sensor with a sensor signal having a positive polarity as position markers approach the sensor, in accordance with an illustrative embodiment.

Another example of the sensor output signal 122 is illustrated in FIG. 5B. In the example of FIG. 5B, as each one of the position markers (e.g. position marker $102_A$) approaches the sensor 112, the sensor output signal 122 increases to a positive value and as each one of the position markers (e.g. position marker $102_A$) passes the sensor 112, the sensor output signal 122 (e.g. a single pulse causing a negative voltage transition) decreases. When the given position marker (e.g. position marker $102_A$) moves away from the sensor 112, the pulse shape is inverted and the sensor output signal 122 is returned to zero. Accordingly, a negative zero-crossing of the sensor output signal 122 may be indicative of the passage of a position marker 102 by the sensor 112.

Thus, depending on the configuration of the sensor 112 and on the polarity of the sensor signal 122 as it approaches the sensor 112, the positive zero-crossing (as shown in FIG. 5A) or negative zero-crossing (as shown in FIG. 5B) of the voltage waveform 122 may be used to detect the position markers $102_A$, $102_B$, $102_C$.

Referring back to FIG. 3, a detection module 116 is electrically connected to the sensor(s) 112 and configured to receive output signal(s) therefrom. The sensor's output voltage signal 122 is received at the detection module 116, which continuously monitors the sensor signal 122 to detect the zero-crossing transitions of the voltage waveform 122. The detection module 116 may comprise one or more computing devices including, but not limited to, a digital computer, a processor (e.g. a microprocessor), and a memory. The detection module 116 may be implemented in a single computing device or may be implemented using various computing devices and/or components. The detection module 116 may be implemented using an analog signal processing circuit comprising various passive and/or active electronic components. The detection module 116 receives the sensor signal 122 comprising a first series of pulses $135_A$, $135_B$ and $135_C$ indicative of passage of the position markers 102 by the sensor 112. The detection module 116 is configured to detect the zero-crossing transition of each pulse. Rather than only detecting a zero-crossing, the detection module 116 is configured to detect the zero-crossing transition when the sensor signal 122 has a magnitude exceeding a crossing threshold (e.g. after the magnitude of the sensor signal 122 has exceeded the crossing threshold). The crossing threshold is a non-zero value and may also be referred to as an arming threshold or an arming level. Accordingly, when such a zero-crossing transition is detected and the sensor signal 122 has a magnitude that exceeds the crossing threshold, the detection module 116 determines that the increase in voltage corresponds to detection by the sensor 112 of passage of a position marker (e.g. position marker $102_A$). In some embodiments, the assessment of whether the sensor signal 122 has a magnitude that exceeds the crossing threshold is assessed before the zero-crossing transition is detected. In other embodiments, the assessment of whether the sensor signal 122 has a magnitude that exceeds the crossing threshold is assessed after the zero-crossing transition is detected. Upon detecting a zero-crossing transition having a magnitude exceeding the crossing threshold, another zero-crossing transition is not detected until the crossing threshold is again exceeded. In other words, a subsequent zero-crossing transition is detected when the sensor signal 122 has a zero-crossing having a subsequent magnitude exceeding the crossing threshold.

Figure 6A:
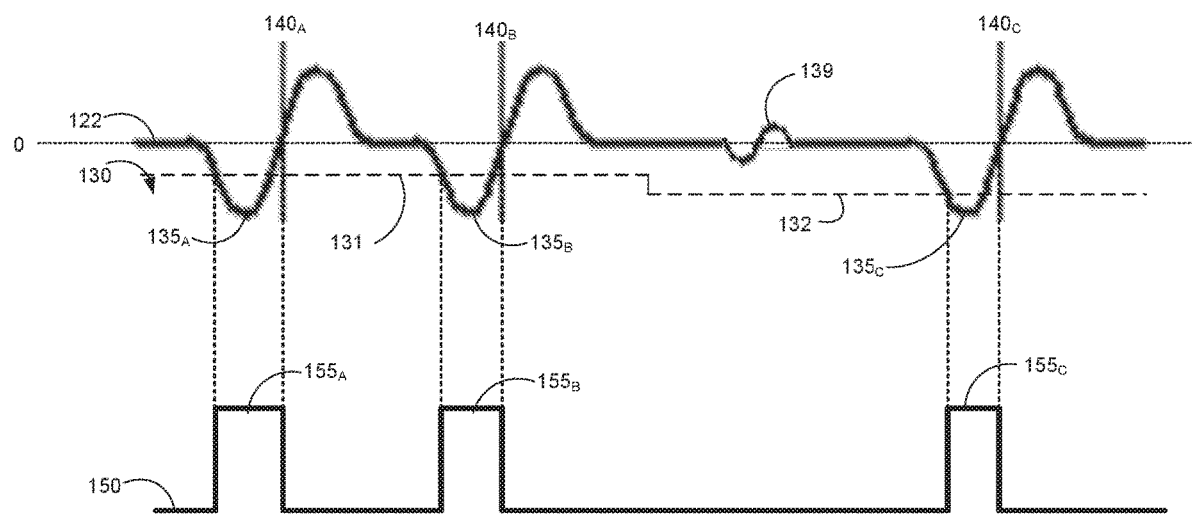
FIG. 6A illustrates the sensor signal of FIG. 5A and a crossing threshold used in detecting positive zero-crossing transitions of pulses of the sensor signal that exceed the crossing threshold.

The detection module 116 may generate a detection signal 150 comprising a second series of pulses $155_A$, $155_B$ and $155_C$, as is illustrated in the example in FIG. 6A. The second series of pulses $155_A$, $155_B$ and $155_C$ is indicative of selected pulses from the first series of pulses $135_A$, $135_B$ and $135_C$ (see FIG. 5A) that have a zero-crossing and have a magnitude that exceeds the crossing threshold 130. In this example, the assessment of whether the pulses $135_A$, $135_B$, and $135_C$ have a magnitude that exceeds the crossing threshold 130 is performed prior to the detection of the zero-crossings $140_A$, $140_B$, $140_C$. Each pulse $155_A$, $155_B$ and $155_C$ of the detection signal 150 corresponds to a pulse $135_A$, $135_B$ and $135_C$ of the sensor signal 122 that has a zero-crossing (positive in FIG. 6A and negative in FIG. 6B) $140_A$, $140_B$, $140_C$ and a magnitude that exceeds the crossing threshold 130. In accordance with an embodiment, the polarity of the crossing threshold is of the same polarity as the sensor signal 122 as a given position marker ($102_A$, $102_B$ or $102_C$ in FIG. 5A) approaches the sensor 112. In the examples illustrated in FIGS. 6A and 6B, the detection module 116 identifies a voltage of the sensor signal 122 having a magnitude that exceeds the crossing threshold 130 before the zero-crossing event is detected. The detection module 116 may then determine the rotational speed of the propeller 30 from the detection signal 150, based on a time interval elapsed between passage of a plurality of pulses (e.g., the passage of the falling edges) of the second series of pulses $155_A$, $155_B$ and $155_C$.

It should be appreciated that, by using the crossing threshold 130, false detection of passage of the position markers 102 may be reduced. The sensor signal 122 may comprise various different types of noise. Some types of noise present on the sensor signal 122 may be dependent on the rotational speed of the propeller 30, for example, such as noise pulses caused by magnetic hot spots on the feedback ring 104, where the noise pulses increase in magnitude with increasing propeller rotational speed. Some types of noise are not dependent on the rotational speed of the propeller 30, for example, such as electromagnetic interference (EMI) and coil-coil crosstalk during intermittent coil faults. Furthermore, the peak amplitude of the sensor signal 122 may vary with rotational speed of the propeller 30. For example, the peak amplitude of the sensor signal 122 may increase proportionally with the rotational speed of the propeller 30. In accordance with an embodiment, the detection module 116 is configured to adjust the crossing threshold 130 as a function of the rotational speed of the propeller 30. For example, the detection module 116 may compare the rotational speed of the propeller 30 to a speed threshold. Then, when the rotational speed is less than or equal to (i.e., does not exceed) the speed threshold, the detection module 116 may set the crossing threshold 130 at a first value 131. When the rotational speed of the propeller 30 exceeds the speed threshold, the detection module 116 may set the crossing threshold 130 at a second value 132. The first value 131 may correspond to a lower magnitude value than the second value 132. It should be appreciated that it is desirable that the crossing threshold 130 (e.g., the first value 131) is set at a minimum value that is high enough to avoid EMI noise at low propeller rotational speeds but not high enough to miss detection of the position markers 102. Once the propeller rotational speed is high enough (e.g., over the speed threshold), the crossing threshold 130 may be adjusted. The crossing threshold 130 may be adjusted to the second value 132 and/or to an adaptive value, as the peak amplitude of the sensor signal 122 increases with increasing propeller rotational speed. This adjusting of the crossing threshold 130 may further add noise immunity over noise sources not dependent on propeller rotational speed and to keep the crossing threshold 130 higher than the noise sources that are dependent on propeller rotational speed.

Figure 6B:
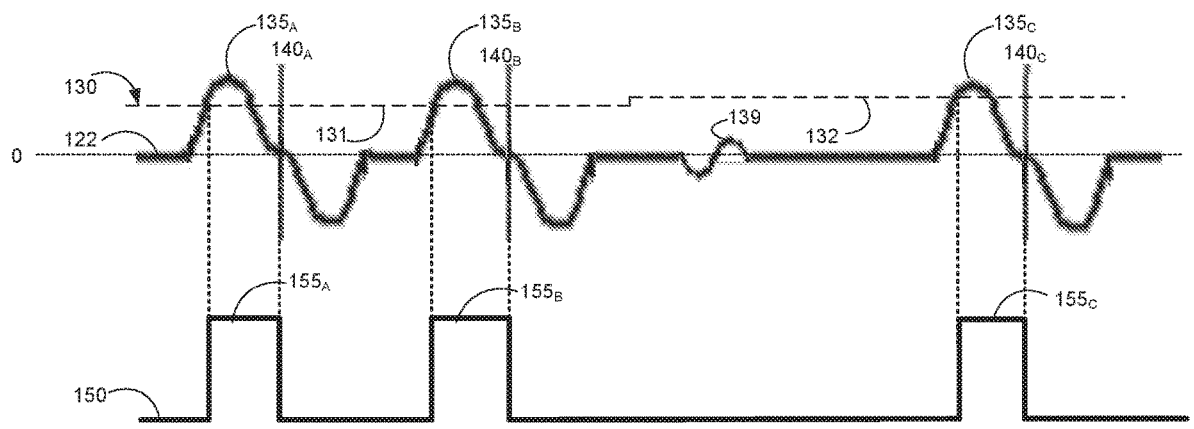
FIG. 6B illustrates the sensor signal of FIG. 5B and a crossing threshold used in detecting negative zero-crossing transitions of pulses of the sensor signal that exceed the crossing threshold.
Figure 6C:
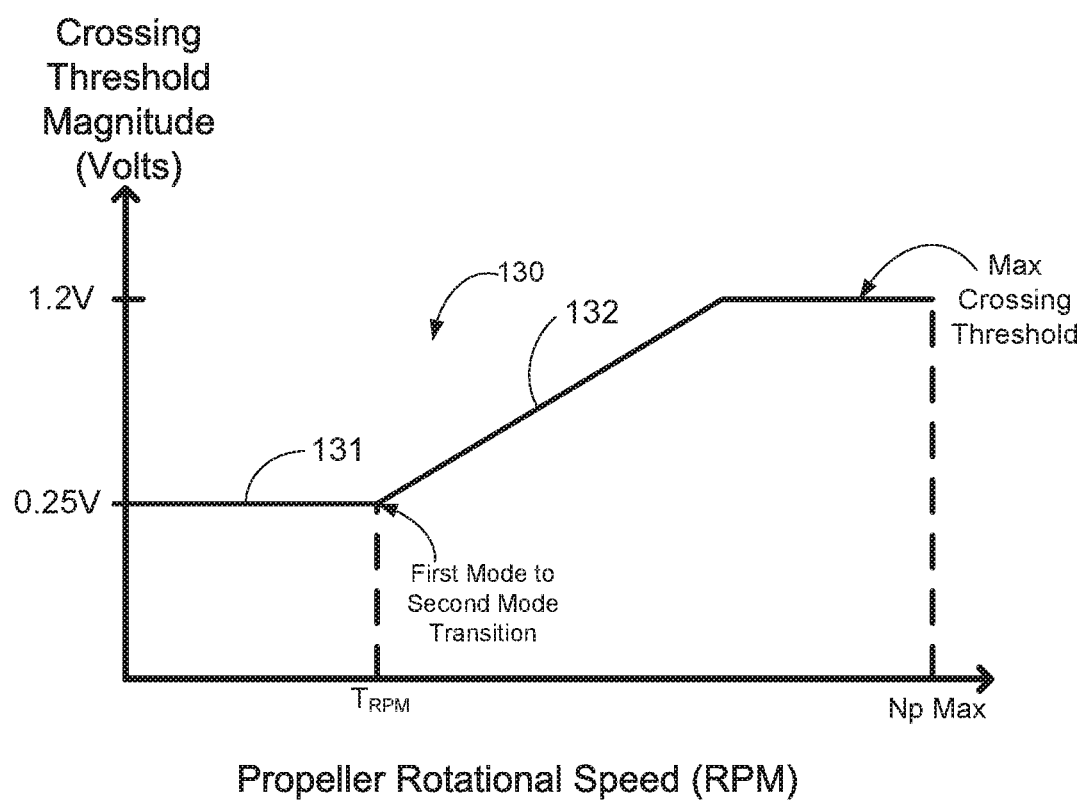
FIG. 6C is a plot of an example crossing threshold as a function of propeller rotational speed, in accordance with an illustrative embodiment.

With reference to FIG. 6C, the detection module 116 may compare the rotational speed of the propeller 30 to the speed threshold $T_{RPM}$. Then, when the rotational speed is less than or equal to (i.e., does not exceed) the speed threshold $T_{RPM}$, the detection module 116 may operate in a first mode where the crossing threshold 130 is set at a first value 131. When the rotational speed of the propeller 30 exceeds the speed threshold $T_{RPM}$, the detection module 116 may transition to a second mode of operation where the crossing threshold is set at a value 132. The value 132 is illustratively set as a function of the peak amplitude value of the sensor signal 122 and increases with increasing propeller rotational speed, until a maximum possible value (labelled "Max Crossing Threshold" and illustratively set at 1.2V in FIG. 6C) is reached.

When the rotational speed is less than or equal to the speed threshold $T_{RPM}$, the detection module 116 may set the crossing threshold 130 at a static value (also referred to herein as a "constant value"). In other words, the first value 131 may be a static value (equal to 0.25V in FIG. 6C, for illustrative purposed only) that is used while the rotational speed is less than or equal to the speed threshold $T_{RPM}$. In some embodiments, when the rotational speed is less than or equal to the speed threshold $T_{RPM}$, the detection module 116 may set the crossing threshold 130 at an adaptive value that changes based on previous peak amplitude values of the sensor signal 122. In other words, the first value 131 may change based on previous peak amplitude values of the sensor signal 122. That is, the crossing threshold may be set at a ratio (e.g., 1/3) of the peak amplitude value of the sensor signal 122.

When the rotational speed exceeds the speed threshold $T_{RPM}$, the detection module 116 may set the crossing threshold 130 at an adaptive value that changes based on previous peak amplitude values of the sensor signal 122 (as shown in FIG. 6C). In other words, the second value 132 may change based on previous peak amplitude values of the sensor signal 122. That is, the crossing threshold may be set at a ratio (e.g., 1/3) of the peak amplitude value of the sensor signal 122. The ratio used in setting the crossing threshold while the rotational speed is less than or equal to the speed threshold $T_{RPM}$ may be a higher value than the ratio used in setting the crossing threshold while the rotational speed exceeds the speed threshold $T_{RPM}$. The values of the ratio(s) may vary depending on practical implementations. In some embodiments, the detection module 116 may set the crossing threshold 130 at a static value when the rotational speed exceeds the speed threshold $T_{RPM}$. Accordingly, the second value 132 may be a static value that is used while the rotational speed exceeds the speed threshold $T_{RPM}$.

In accordance with an embodiment and as discussed herein above, the detection module 116 is configured to adjust the crossing threshold 130 as a function of the peak amplitude of the sensor signal 122. For example, the detection module 116 may compare the peak amplitude of the sensor signal 122 to an amplitude threshold. Then, when the peak amplitude is less than or equal to (i.e., does not exceed) the amplitude threshold, the detection module 116 may set the crossing threshold 130 at the first value 131. When the peak amplitude exceeds the amplitude threshold, the detection module 116 may set the crossing threshold at the second value 132. The first and second values 131, 132 may be set as described elsewhere in this document.

In accordance with another embodiment, the detection module 116 is configured to adjust the crossing threshold 130 as a function of at least one engine parameter. For example, the detection module 116 may determine whether at least one engine auxiliary (e.g., igniter, anti-ice system, engine starter, electrical generator or any other suitable engine auxiliary) is powered on. If the at least one engine auxiliary is powered on, the crossing threshold 130 is set at the first value 131. If the at least one engine auxiliary is powered off, the crossing threshold 130 is set at the second value 132. In this example, the first value 131 may be set at a higher than the second value 132, because an engine auxiliary, when powered on, may provide an additional noise source not present when the engine auxiliary is powered off. By way of another example, the detection module 116 may determine whether the engine 10 is set for running on the ground or in-flight idle. If the engine is running on the ground, the crossing threshold 130 is set at the first value 131. If the engine is idling in-flight, the crossing threshold 130 is set at the second value 132. By way of yet another example, the detection module 116 may determine whether a signal (e.g., an engine rotational speed signal, a blade angle position signal or any other suitable signal) is present or lost, while the engine 10 is running. If the signal is lost, the crossing threshold 130 is set at the first value 131. If the signal is present, the crossing threshold 130 is set at the second value 132. A further example is that the detection module 116 may determine whether a noise level on the detection signal 150 exceeds a noise level threshold. If the noise level exceeds the noise level threshold, the crossing threshold 130 is set at the first value 131. If the noise level is below or equal to the noise level threshold, the crossing threshold 130 is set at the second value 132. In this example, the first value 131 may be set at a higher value than the second value 132, because when the noise level in the detection signal 150 is over a certain amount, the crossing threshold 130 may be set to the higher value in an attempt to raise the crossing threshold 130 over any noise present on the sensor signal 122. Accordingly, the detection module 116 may set the crossing threshold 130 at the first value 131 when the engine parameter is less than or equal to an engine parameter threshold and set the crossing threshold 130 at the second value 132 when the engine parameter exceeds the engine parameter threshold. In this case, the engine parameter may be oil pressure, compressor discharge pressure, fuel pressure or any other suitable engine parameter.

As shown in FIG. 6A, the sensor signal 122 is illustrated where the crossing threshold 130 has a first value 131 that is then adjusted to a second value 132. In this example, each of the pulses $135_A$, $135_B$ and $135_C$ has a positive zero-crossing and has a magnitude that exceeds the crossing threshold 130. Thus, in this example, the detection module 116 detects the passage of the position markers $102_A$, $102_B$, $102_C$. The detection module 116 may then generate the example detection signal 150 having pulses $155_A$, $155_B$ and $155_C$, which are indicative of the pulses $135_A$, $135_B$ and $135_C$ of the sensor signal 122 that have a positive zero-crossing and have a magnitude that exceeds the crossing threshold 130. In the illustrated example, the sensor signal 122 has an example noise component 139 with a zero-crossing. However, as the noise component 139 does not have a magnitude that exceeds the crossing threshold 130, no zero-crossing transition is detected. Consequently, no pulse corresponding to the noise component 139 is present in the detection signal 150.

Similarly, as shown in FIG. 6B, the sensor signal 122 is illustrated where the crossing threshold 130 has a first value 131 that is then adjusted to a second value 132. In this example, each of the pulses $135_A$, $135_B$ and $135_C$ has a negative zero-crossing that exceeds the crossing threshold 130. Thus, in this example, the detection module 116 detects the passage of the position markers $102_A$, $102_B$, $102_C$. The detection module 116 may then generate the example detection signal 150 having pulses $155_A$, $155_B$ and $155_C$, which are indicative of the pulses $135_A$, $135_B$ and $135_C$ of the sensor signal 122 that have a negative zero-crossing and have a magnitude that exceeds the crossing threshold 130.

While the sensor signal 122 and the detection signal 150 are illustrated as being synchronous in time in FIGS. 6A and 6B, this is for illustration purposes only to illustrate corresponding pulses between the two signals 122, 150. It should be appreciated that there would typically be a time delay between the sensor signal 122 and the detection signal 150, the delay typically depending on the processing time of the detection module 116. The detection module 116 may further determine, from the output signal(s) received the sensor (s) 112, the rotational speed of the propeller 30. Other applications will be readily understood by a person skilled in the art.

Figure 7A:
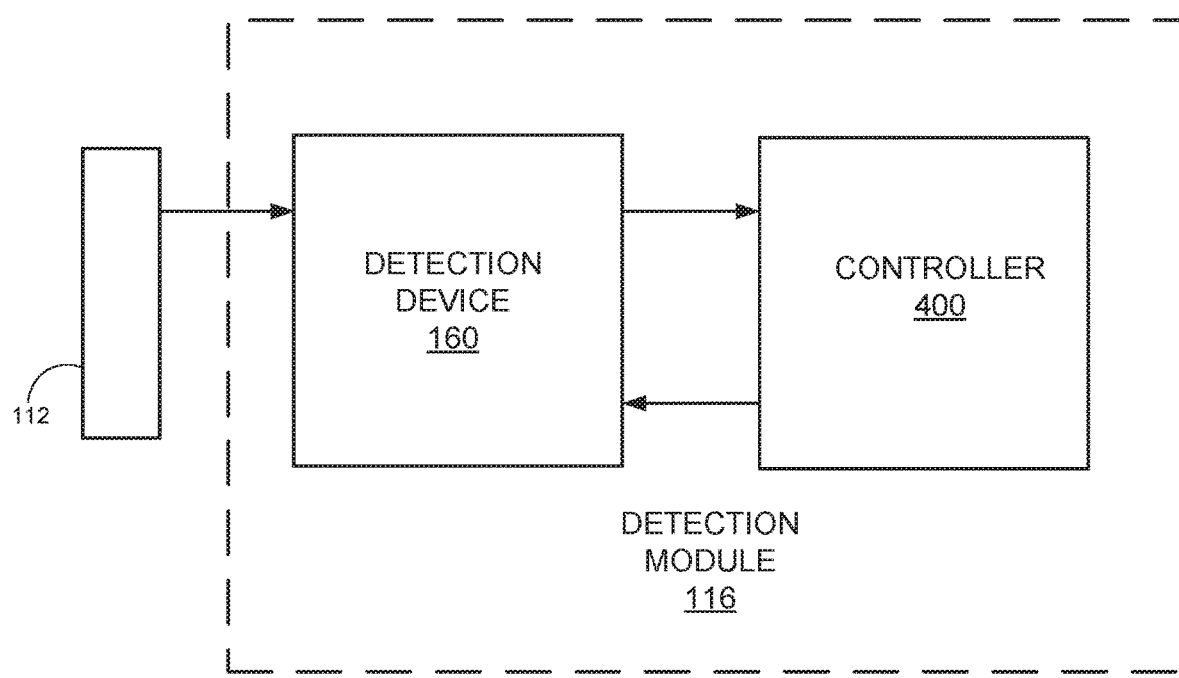
FIG. 7A is a block diagram of the detection module of FIG. 3, in accordance with an illustrative embodiment.

With reference to FIG. 7A, a specific and non-limiting example of implementation of the detection module 116 is shown. In this example, the detection module 116 comprises a detection device 160 and a controller 400. The detection device 160 is electrically connected to the sensor(s) 112. The detection device 160 may be an interface device for use with a variable reluctance or magnetic core sensor(s). For example, the detection device 160 may be implemented using a MAX9924-MAX9927 variable reluctance sensor interface device provided by Maxim Integrated Products Inc. The detection device 160 processes the sensor signal 122 to generate the detection signal 150. The controller 400 is electrically connected to the detection device 160 for obtaining the detection signal 150 from the detection device 160 and for controlling the detection device 160. The controller 400 may be any suitable computing device. The controller 400 may determine the rotational speed of the propeller 30 from the detection signal and/or may cause the detection device 160 to adjust the crossing threshold 130 that the detection device 160 uses in determining the detection signal 150.

In accordance with an embodiment, the crossing threshold 130 that the detection device 160 uses may be set in different manners depending on a mode of operation of the detection device 160. The detection device 160 may operate in at least two modes of operation. In a first mode of operation, a reference voltage applied at an external (EXT) input of the detection device 160 is used to set the crossing threshold 130. For example, the controller 400 may apply a voltage level at the EXT input to set the crossing threshold 130 at a given value. This may be done by the controller 400 providing a pulse width modulation (PWM) signal that is filtered and applied to the EXT input of the detection device 160. For example, the controller 400 may apply a voltage level with a constant value at the EXT input to set the crossing threshold 130 at a constant value. By way of another example, the controller 400 may adjust the voltage level at the EXT input to adjust the crossing threshold 130 (e.g., to implement a crossing threshold 130 with an adaptive value).

In a second mode of operation, an adaptive threshold feature is enabled in the detection device 160. In the second mode, the detection device 160 may adaptively adjust the crossing threshold 130 based on previous peak amplitude values of the sensor signal 122. For example, at any given time, the controller 400 may command the detection device 160 to set the crossing threshold at a ratio (e.g., 1/3) of the peak amplitude value of the sensor signal 122. The value of the ratio used by the detection device 160 may be set by the controller 400 or may be a value automatically set by the detection device 160. Accordingly, as the sensor signal's peak voltage rises, the crossing threshold 130 is also increased by the same ratio. Conversely, decreasing peak voltage levels of the sensor signal 122 causes the crossing threshold 130 to decrease to a lower level.

The controller 400 may control the mode of operation of the detection device 160 (and accordingly the crossing threshold 130) based on the rotational speed of the propeller 30. The controller 400 is configured to provide control signals to the detection device 160 to control the mode of operation of the detection device 160. For example, the controller 400 may compare the rotational speed of the propeller 30 to the speed threshold. When the rotational speed is less than or equal to the speed threshold, the controller 400 may command the detection device 160 to operate in the first mode and may command the detection device 160 to set the crossing threshold 130 at a given value. The given value may be a static value or the controller 400 may command the detection device to adjust the given value (e.g., by varying the voltage applied at the EXT input to adaptively adjust the crossing threshold 130). When the rotational speed of the propeller 30 exceeds the speed threshold, the controller 400 may command the detection device 160 to operate in the second mode (i.e. where the detection device 160 automatically and adaptively adjusts the crossing threshold 130).

The controller 400 may control the mode of operation of the detection device 160 (and accordingly the crossing threshold 130) based on the engine parameter. The controller 400 may command the detection device 160 to operate in the first mode or the second mode depending on the engine parameter. For example, the if the engine parameter has the first condition the controller 400 may command the detection device 160 to operate in the first mode; and if the engine parameter has the second condition, the controller 400 may command the detection device 160 to operate in the second mode. By way of another example, if the engine parameter is equal to or below the engine parameter threshold, the controller 400 may command the detection device 160 to operate in the first mode; and if the engine parameter exceeds the engine parameter threshold, the controller 400 may command the detection device 160 to operate in the second mode.

A digital counter (not illustrated in FIG. 7), may be provided in the detection module 116. The digital counter may be implemented in the controller 400 or may be a separate physical device (e.g., a free-running 20 MHz counter) that receives the detection signal 150 from the detection device 160 and provides a count signal to the controller 400. The digital counter may determine the time interval elapsed between passage of each pulse $155_A$, $155_B$ and $155_C$ of the detection signal 150 and hence determine the time interval elapsed between passage of the position markers 120 nearby (e.g. adjacent) the sensor 112. In accordance with an embodiment, the digital counter starts counting the number of digital clock cycles between detection of a first position marker (e.g., position marker $102_A$) and detection of the next position marker (e.g. position marker $102_A$). For example, the digital counter may start counting the number of digital clock cycles between positive transitions of the detection signal 150. The digital count may record time-stamps of the passage of each pulse $155_A$, $155_B$ and $155_C$ of the detection signal 150.

The rotational speed of the propeller 30 is determined from the detection signal 150. The rotational speed is determined based on a time interval between a plurality of pulses of the second series of pulses $155_A$, $155_B$ and $155_C$. For example, if the feedback ring 104 has one (1) tooth, each detection of the tooth indicates one (1) revolution of the feedback ring 104 (and the shaft 24). Thus, in this example, the time interval elapsed between passage of two consecutive pulses of the detection signal 150 conveys the time required for one revolution and the rotational speed corresponds to the inverse of this time interval. Accordingly, the rotational speed may be determined based on a time interval between a plurality of pulses of the detection signal 150, based on the number of position markers 102 on the feedback ring 104, and based on the number of pulses detected in the time interval. For example, a number of pulses of the detection signal 150 may be monitored over a time period (e.g., multiple time intervals detected by the counter). Then, the rotational speed may be determined from the time period (e.g., the summation of these multiple time intervals), the number of pulses detected over this time period, and the number of position markers 102 on the feedback ring 104.

In some embodiments, the rotational speed is determined as a function of time-stamps of a given number of detected zero-crossing events from the detection signal 150. A buffer may store time-stamp values corresponding to the detected zero-crossing events. The elapsed time between the given number of detected zero-crossing events may then be determined. When the given number corresponds to the number of position markers 102 on the feedback ring 104, the value of the determined elapsed time may be inverted and multiplied by sixty (60) to determine the propeller speed in RPMs. For example, if the feedback ring 104 comprises seventeen (17) position markers 102, the total elapsed time between seventeen (17) zero-crossing events is determined; then, the determined elapsed time is inverted and multiplied by sixty (60) to determine the propeller speed in RPMs. In some embodiments, a rolling buffer of a certain number of values (e.g., 17 values) may be used, where each detected zero-crossing event timestamp is inserted at the first value of the buffer and the last value of the buffer (e.g., the 17$^{th}$ value) corresponding to the oldest value is discarded.

In a specific and non-limiting example of implementation, the counter determines the number of clock cycles between detection of passage of the teeth $102_A$, $102_C$ and detection of passage of a detection tooth $102_B$ of the feedback ring 104, as indicated in the detection signal 150. The interval of time between the passage of a first tooth $102_A$ and the passage of the detection tooth $102_B$ is indicated as Tm while the interval of time between the passage of the detection tooth $102_B$ and the passage of a second tooth $102_C$ is indicated as Ts. The detected time intervals Tm and Ts are then stored in the memory for subsequent processing by the detection module 116. The rotational speed can be computed on the basis of the sum of the timeframe values (Tm+Ts) and the number of position markers 102A, 102B, 102C, using known computation methods.

Figure 7B:
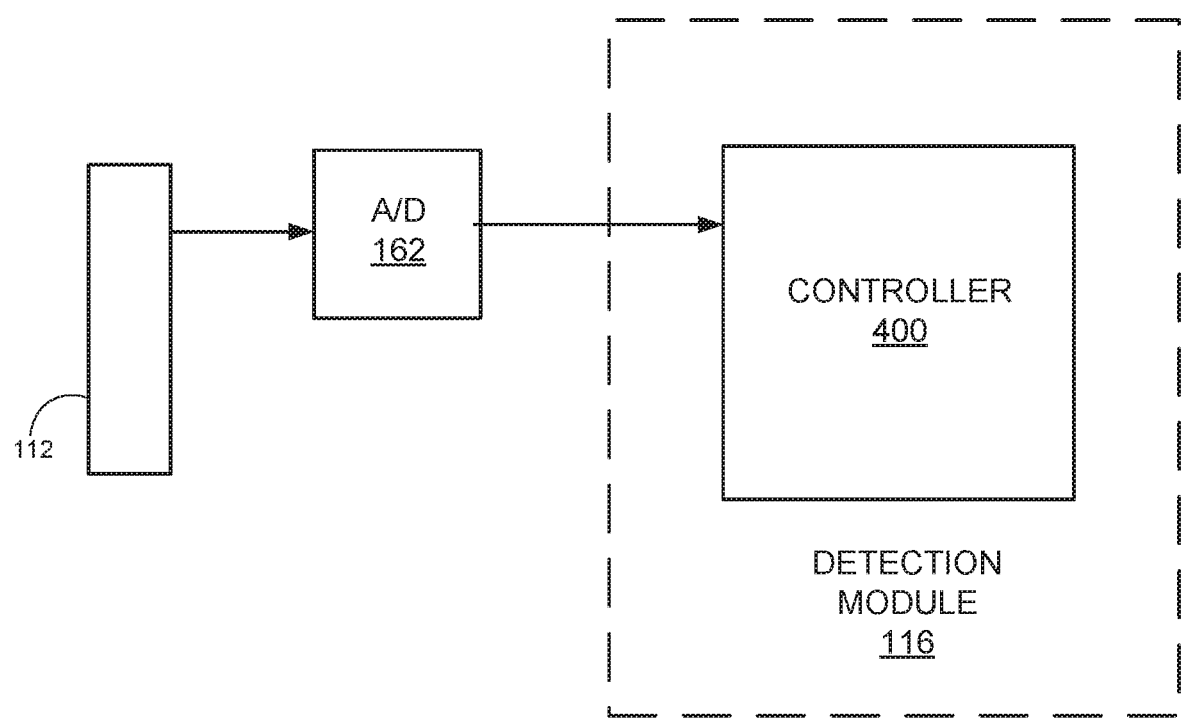
FIG. 7B is a block diagram of a variant of the detection module of FIG. 3, in accordance with an illustrative embodiment.

With reference to FIG. 7B, another specific and non-limiting example of implementation of the detection module 116 is shown. In this example, the detection module 116 comprises the controller 400 and an analog-to-digital (A/D) converter 162 is provided to digitize the analog waveform from the sensor 112. The analog-to-digital converter 162 may be provided separate from the controller 400 or the sensor 112. Alternatively, the analog-to-digital converter 162 may be provided as part of the controller 400 or the sensor 112. The analog-to-digital converter 162 may be provided as part of the detection module 116. In other embodiments, the sensor 112 may provide a digital signal and the analog-to-digital converter 162 may be omitted. In this example, the controller 400 is configured to implement the functionality of the detection device 160 as described elsewhere in this document.

Figure 8A:
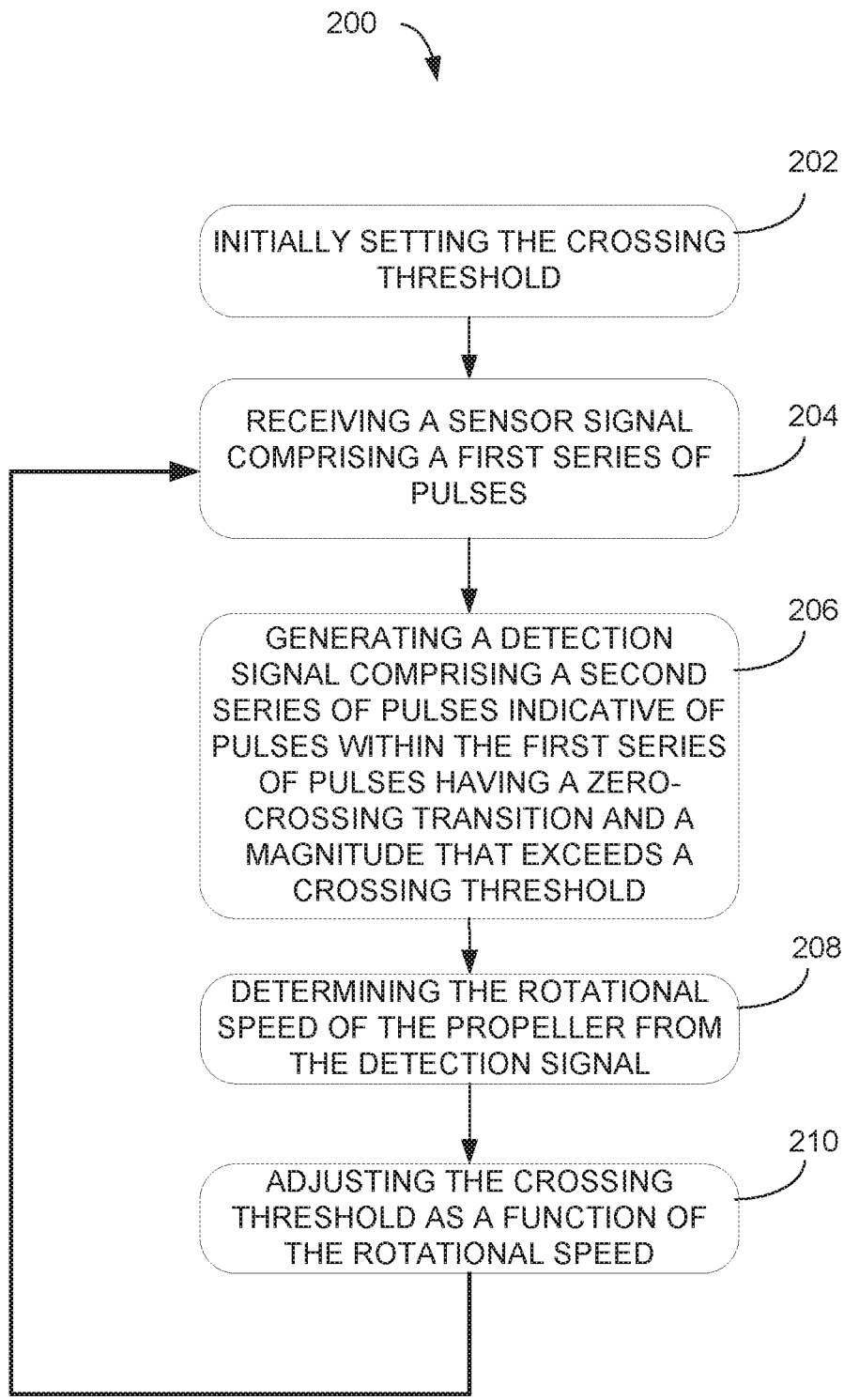
FIG. 8A is a flowchart of a method for controlling a crossing threshold, in accordance with an embodiment.

With reference to FIG. 8A, there is shown a flowchart illustrating an example method 200 for controlling the crossing threshold 130 used in determining the rotational speed of a propeller. While method 200 is described herein with reference to engine 10, this is for example purposes. The method 200 may be applied to any suitable engine. In accordance with an embodiment, the method is performed by the detection module 116. At step 202, the crossing threshold 130 is initially set (i.e., the crossing threshold is set at an initial value). For instance, at start-up of the engine 10 or the start of performance of method 200, the crossing threshold 130 may be initially set at the first value 131. Similarly, at start-up of the engine 10 or at the start of performance of method 200, a mode of operation (e.g., the first mode) may be set and the crossing threshold 130 may be set based on this mode of operation. At step 204, the sensor signal 122 is received. The sensor signal 122 comprises the first series of pulses $135_A$, $135_B$ and $135_C$ indicative of passage of position markers $102_A$, $102_B$ and $102_C$ about a circumference of the propeller shaft 24. At step 206, the detection signal 150 is generated. The detection signal 150 comprises the second series of $155_A$, $155_B$ and $155_C$ indicative of pulses within the first series of pulses $135_A$, $135_B$ and $135_C$ that have a zero-crossing transition $140_A$, $140_B$ and $140_C$ and a magnitude that exceeds the crossing threshold 130. At step 208, the rotational speed of the propeller 30 is determined from the detection signal 150 based on a time interval between a plurality of pulses second series of pulses $155_A$, $155_B$ and $155_C$. At step 210, the crossing threshold is adjusted as a function of the rotational speed. After step 210, the method 200 may return to step 204 and repeat steps 204 to 210 during operation of the engine 10.

In some embodiments, the blade angle (or beta position) of the propeller 30 may be determined from a second series of pulses $155_A$, $155_B$ and $155_C$. The blade angle may be determined from the second series of pulses $155_A$, $155_B$ and $155_C$ using the techniques described in U.S. Patent Application Publication Nos. 2015/0139798, 2018/0050789 and 2018/0050816.

In some embodiments, the determined rotational speed (and/or blade angle) may be outputted to an aircraft computer, for example, to display the rotational speed (and/or the blade angle) on an aircraft or cockpit display. The determined rotational speed (and/or blade angle) may be used by the controller 400 (or another engine controller and/or aircraft computer) for various engine and/or aircraft control. For example, the determined rotational speed (and/or blade angle) may be used to adjust the fuel flow to the engine. The determined rotational speed may be used as feedback for propeller speed governing. The determined blade angle may be used as feedback for setting for propeller servo piston oil flow to set the propeller blade angle.

Figure 8B:
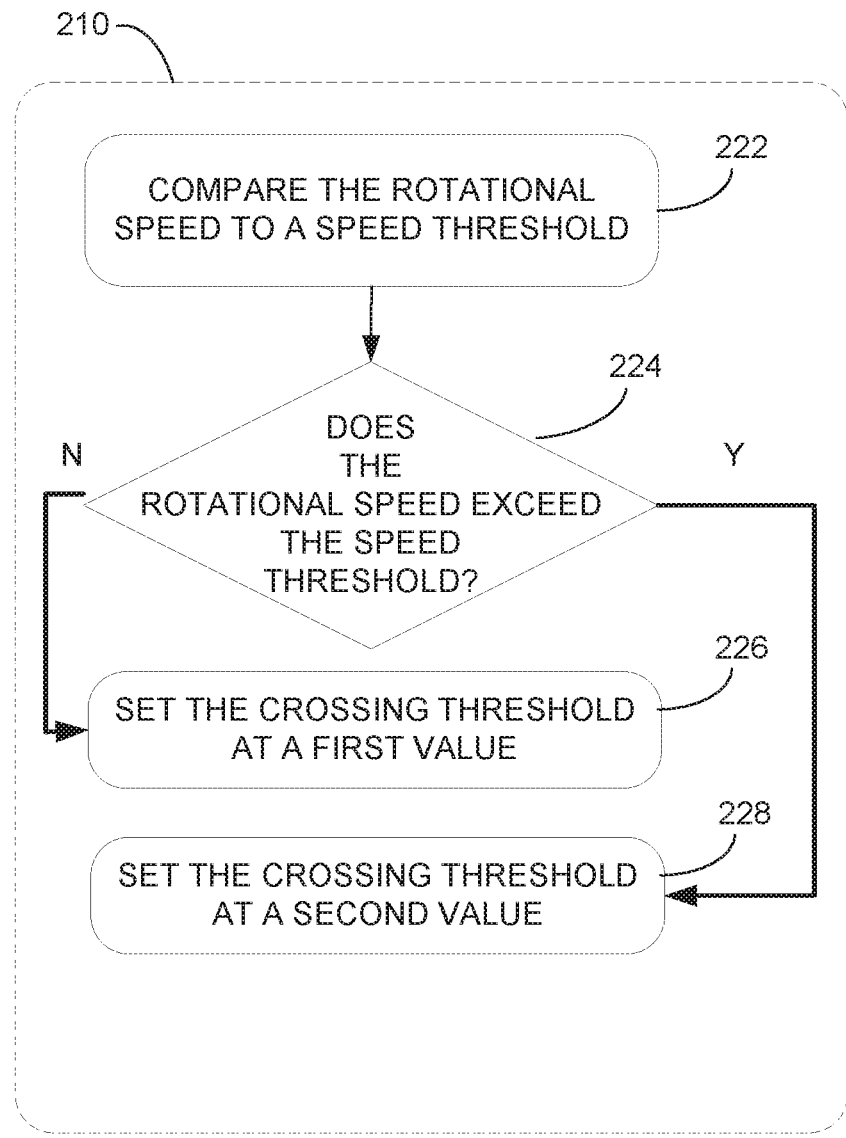
FIG. 8B is a flowchart illustrating the step of FIG. 8 of adjusting the crossing threshold as a function of propeller rotational speed, in accordance with an embodiment.

With additional reference to FIG. 8B, an embodiment of step 210 for adjusting the crossing threshold 130 is illustrated. At step 222, the rotational speed is compared to a speed threshold. The speed threshold may be a predetermined value that is determined based on noise characteristics of the sensor signal 122 as a function of rotational speed of the propeller 30. For example, it may be known that for propeller rotational speeds between 0 and 500 RPM, the sensor signal 122 may exhibit a high level of noise. Thus, when the propeller rotational speed is less than or equal to 500 RPM, the crossing threshold 130 may be set at a higher value than when the propeller rotational speed exceeds 500 RPM. At step 224, it is assessed whether the rotational speed exceeds the speed threshold. At step 226, when the rotational speed is less than or equal to the speed threshold, the crossing threshold 130 is set at the first value 131 (or maintained at the first value 131, if the crossing threshold 130 is currently set at the first value). At step 226, setting the crossing threshold 130 at the first value 131 may comprises setting the crossing threshold 130 at a constant value or may comprise setting the crossing threshold 139 at a value that is a function of a peak amplitude of a previous one of the sensor signal 122. At step 228, when the rotational speed exceeds the speed threshold, the crossing threshold 130 is set at the second value 132. At step 228, setting the crossing threshold 130 at the second value 132 may comprises setting the crossing threshold 130 at a value that is a function of a peak amplitude the sensor signal 122.

In some embodiments, setting and/or adjusting the crossing threshold 130 at step 202 and/or step 210 comprises the controller 400 commanding the detection device 160 to set the crossing threshold 130. In some embodiments, the controller 400 commanding the detection device 160 to set the crossing threshold 130 comprises providing a value for setting the crossing threshold 130. In some embodiments, the controller 400 commanding the detection device 160 to set the crossing threshold 130 comprise determining a mode of operation for the detection device 160 and commanding the detection device 160 to operate in the determined mode of operation. For example, the detection device 160 may be commanded to operate in the first mode and be commanded to set the crossing threshold 130 at a given value (e.g., a constant value or a value that is a function of a peak amplitude of the sensor signal 122. This commanding of the detection device 160 to operate in the first mode may be done when the rotational speed is less than or equal to the speed threshold or when initially performing the method 200. By way of another example, the detection device 160 may be commanded to operate in the second mode, where the crossing threshold 130 is set at an adaptive value that varies depending on a peak amplitude of the sensor signal 122. This commanding of the detection device 160 in the second mode may be done when the rotational speed exceeds the speed threshold.

In some embodiments, the detection device 160 is configured to receive the sensor signal 122 from the sensor 112 at step 204 and to generate the detection signal 150 at step 206. In some embodiments, the controller 400 receives the detection signal 150 from the detection device 160. Accordingly, steps 202, 208 and 210 may be performed by the controller 400.

In some embodiments, the detection device 160 may be commanded to operate in the first mode of operation without necessarily having to operate in the second mode. The controller 400 may adjust the crossing threshold 130 by applying a voltage signal to the EXT input of the detection device 160. The adjusting of the crossing threshold 130 may be done by the controller 400 outputting a PWM signal that is then filtered and applied to the EXT input. The controller 400 may be configured to function in a similar manner to the functionality of the detection device 160, when the detection device 160 is operating in the second mode of operation. For example, the controller 400 may adjust the PWM signal to set the crossing threshold at an adaptive value that varies depending on a peak amplitude of a previous pulse of the first series of pulses of the sensor signal 122.

Figure 9:
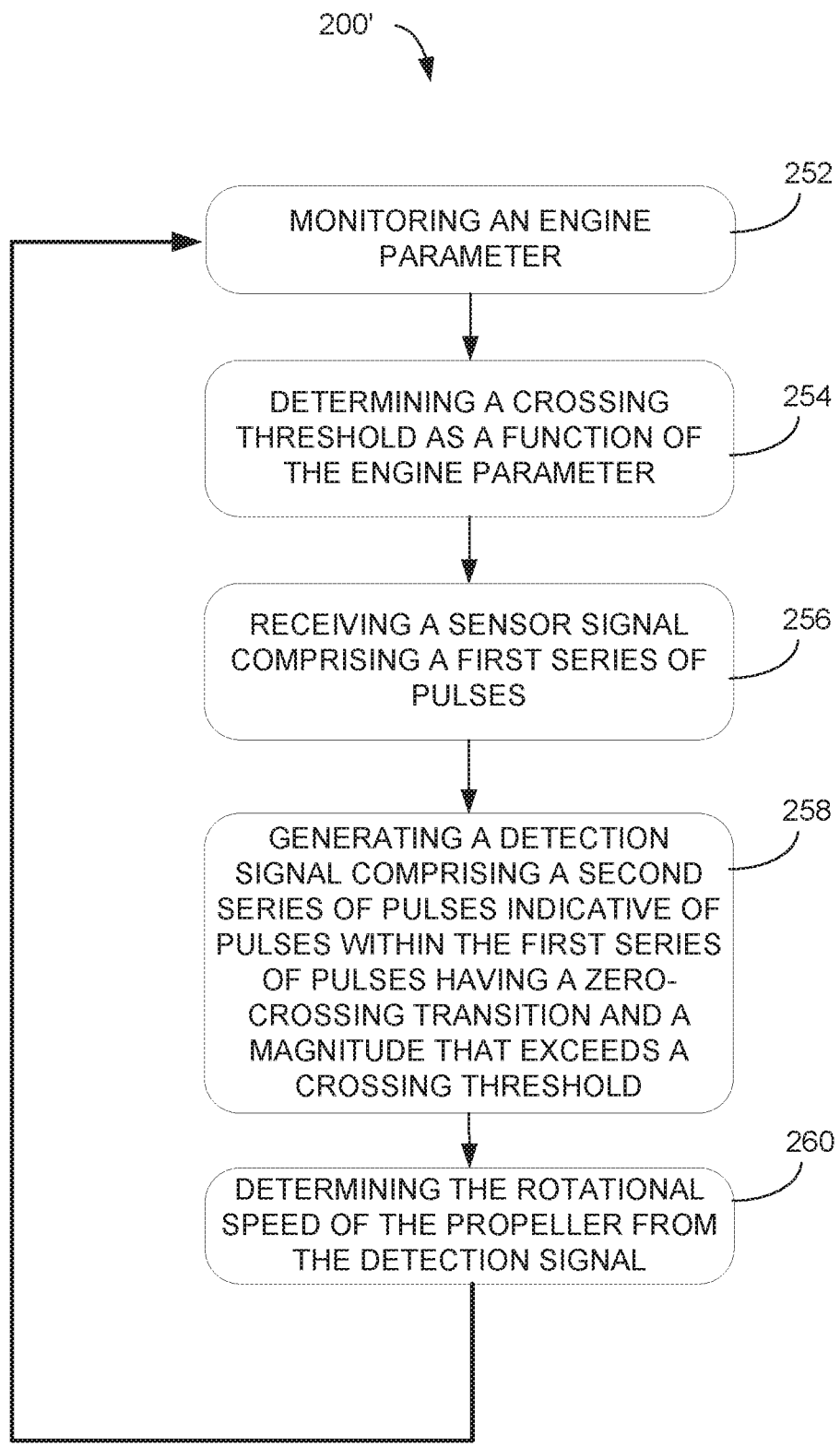
FIG. 9 is a flowchart of a method for determining propeller rotational speed, in accordance with an embodiment

With reference to FIG. 9, there is shown a flowchart illustrating an example method 200' for determining the rotational speed of the propeller 30. At step 252, the engine parameter is monitored. In accordance with an embodiment, the engine parameter monitored is indicative of the rotational speed of the propeller 30. In other words, in accordance with an embodiment, the engine parameter varies with rotational speed. One or more sensors may be used to obtain the engine parameter or the engine parameter may be provided by an engine or aircraft computer. At step 254, the crossing threshold 130 is determined as a function of the engine parameter. At step 256, the sensor signal 122 is received. The sensor signal 122 comprises the first series of pulses $135_A$, $135_B$ and $135_C$ indicative of passage of position markers $102_A$, $102_B$ and $102_C$ about a circumference of the propeller shaft 24. At step 258, the detection signal 150 is generated. The detection signal 150 comprises the second series of $155_A$, $155_B$ and $155_C$ indicative of pulses within the first series of pulses $135_A$, $135_B$ and $135_C$ that have a zero-crossing transition $140_A$, $140_B$ and $140_C$ and a magnitude that exceeds the crossing threshold 130. At step 260, the rotational speed of the propeller 30 is determined from the detection signal 150 based on a time interval between a plurality of pulses the second series of pulses $155_A$, $155_B$ and $155_C$. The method 200' may then be repeated during operation of the engine 10.

Figure 10:
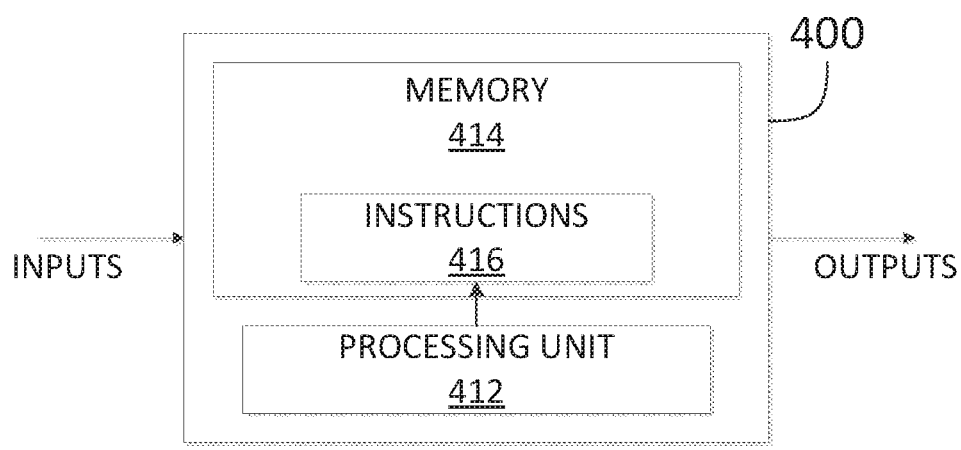
FIG. 10 is a block diagram of an example computing system for implementing the method of FIGS. 8A and 9 in accordance with an embodiment.

With reference to FIG. 10, the methods 200, 200' may be implemented at least in part using the computing device 400 comprising a processing unit 412 and a memory 414 which has stored therein computer-executable instructions 416. The processing unit 412 may comprise any suitable devices configured such that instructions 416, when executed by the computing device 400 or other programmable apparatus, may cause the functions/acts/steps of the methods 200, 200' as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412. In some embodiments, the computing device 400 can be implemented as part of a full-authority digital engine controls (FADEC) or other similar device, including electronic engine control (EEC), engine control unit (ECU), and the like.

The methods and systems for controlling the crossing threshold described herein may be implemented in a high level procedural or object oriented programming or scripting language, or a combination thereof, to communicate with or assist in the operation of a computer system, for example the computing device 400. Alternatively, the methods and systems for controlling the crossing threshold may be implemented in assembly or machine language. The language may be a compiled or interpreted language. Program code for implementing the methods and systems for controlling the crossing threshold may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for controlling the crossing threshold may also be considered to be implemented by way of a non-transitory computer-readable storage medium having a computer program stored thereon. The computer program may comprise computer-readable instructions which cause a computer, or in some embodiments the processing unit 412 of the computing device 400, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The detection device 160 may be implemented in a similar manner to the computing device 400, and may comprise a processing unit (similar to the processing unit 412) and a memory (similar to the memory 414) which has stored therein computer-executable instructions (similar to the computer-executable instructions 416).

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method of controlling a crossing threshold used in determining a rotational speed of a propeller of an aircraft engine, the method comprising:
    setting an initial value for the crossing threshold;
    receiving a sensor signal comprising a first series of pulses indicative of passage of position markers about a circumference of a propeller shaft;
    generating a detection signal comprising a second series of pulses indicative of pulses within the first series of pulses that have a zero-crossing transition and a magnitude that exceeds the crossing threshold;
    determining the rotational speed of the propeller from the detection signal based on a time interval between a plurality of pulses of the second series of pulses; and
    adjusting the crossing threshold as a function of the rotational speed.

2. The method of claim 1, wherein adjusting the crossing threshold comprises:
    comparing the rotational speed to a speed threshold;
    when the rotational speed is less than or equal to the speed threshold, maintaining the crossing threshold at the initial value; and
    when the rotational speed exceeds the speed threshold, setting the crossing threshold at an adjusted value.

3. The method of claim 2, wherein setting the crossing threshold at the initial value comprises setting the crossing threshold at a constant value.

4. The method of claim 2, wherein setting the crossing threshold at the initial value comprises setting the crossing threshold at a value that is a function of a peak amplitude of the sensor signal.

5. The method of claim 2, wherein setting the crossing threshold at the adjusted value comprises setting the crossing threshold at a value that is a function of a peak amplitude of the sensor signal.

6. The method of claim 2, wherein setting the crossing threshold comprises a controller commanding a detection device to set the crossing threshold.

7. The method of claim 6, wherein the detection device is configured to receive the sensor signal from a sensor and to generate the detection signal.

8. The method of claim 7, wherein setting the crossing threshold at the initial value comprises the controller commanding the detection device to operate in a first mode and commanding the detection device to set the crossing threshold at a constant value.

9. The method of claim 7, wherein setting the crossing threshold at the initial value comprises the controller commanding the detection device to operate in a first mode and commanding the detection device to set the crossing threshold at a value that is a function of an amplitude of the sensor signal.

10. The method of claim 7, wherein setting the crossing threshold at the adjusted value comprises the controller commanding the detection device to operate in a second mode where the crossing threshold is set at a value that is a function of an amplitude of the sensor signal.

11. A system for controlling a crossing threshold used in determining a rotational speed of a propeller of an aircraft engine, the system comprising:
   at least one processing unit; and
   at least one non-transitory computer-readable memory having stored thereon program instructions executable by the at least one processing unit for:
      setting an initial value for the crossing threshold;
      receiving a sensor signal comprising a first series of pulses indicative of passage of position markers about a circumference of a propeller shaft;
      generating a detection signal comprising a second series of pulses indicative of pulses within the first series of pulses that have a zero-crossing transition and a magnitude that exceeds the crossing threshold;
      determining the rotational speed of the propeller from the detection signal based on a time interval between a plurality of pulses of the second series of pulses; and
      adjusting the crossing threshold as a function of the rotational speed.

12. The system of claim 11, wherein the program instructions are executable by the at least one processing unit for adjusting the crossing threshold comprising:
   comparing the rotational speed to a speed threshold;
   when the rotational speed is less than or equal to the speed threshold, maintaining the crossing threshold at the initial value; and
   when the rotational speed exceeds the speed threshold, setting the crossing threshold at an adjusted value.

13. The system of claim 12, wherein the program instructions are executable by the at least one processing unit for setting the crossing threshold at the initial value comprising setting the crossing threshold at a constant value.

14. The system of claim 12, wherein the program instructions are executable by the at least one processing unit for setting the crossing threshold at the initial value comprising setting the crossing threshold at a value that is a function of a peak amplitude of the sensor signal.

15. The system of claim 12, wherein the program instructions are executable by the at least one processing unit for setting the crossing threshold at the adjusted value comprising setting the crossing threshold at a value that is a function of a peak amplitude of the sensor signal.

16. The system of claim 12, wherein the program instructions are executable by the at least one processing unit for setting the crossing threshold comprising commanding a detection device to set the crossing threshold.

17. The system of claim 16, wherein the detection device is configured to receive the sensor signal from a sensor and to generate the detection signal.

18. The system of claim 17, wherein the program instructions are executable by the at least one processing unit for setting the crossing threshold at the initial value comprising commanding the detection device to operate in a first mode and commanding the detection device to set the crossing threshold at a constant value.

19. The system of claim 17, wherein the program instructions are executable by the at least one processing unit for setting the crossing threshold at the initial value comprising commanding the detection device to operate in a first mode and commanding the detection device to set the crossing threshold at a value that is a function of an amplitude of the sensor signal.

20. The system of claim 17, wherein the program instructions are executable by the at least one processing unit for setting the crossing threshold at the adjusted value comprising commanding the detection device to operate in a second mode where the crossing threshold is set at a value that is a function of an amplitude of the sensor signal.

* * * * *